United States Patent

[11] 3,623,815

| [72] | Inventors | Andre Fontanel<br>Asnieres;<br>Gerard Grau, Paris, both of France |
|---|---|---|
| [21] | Appl. No. | 838,809 |
| [22] | Filed | July 3, 1969 |
| [45] | Patented | Nov. 30, 1971 |
| [73] | Assignee | Institut Francais du Petrole, des<br>Carburants et Lubrifiants<br>Hauts de Seine, France |
| [32] | Priority | July 4, 1968 |
| [33] | | France |
| [31] | | 157985 |

[54] DEVICE FOR MEASURING THE DIAMETER OF FIBERS AND THREADS OF SMALL THICKNESS USING A CONVERGENT COHERENT LIGHT BEAM
16 Claims, 27 Drawing Figs.

[52] U.S. Cl. .................................................... 356/159,
250/219 S, 356/199

[51] Int. Cl. ............................................... G01b 11/10
[50] Field of Search ........................................... 356/238,
199, 200, 156, 157, 158, 159; 250/219 S

[56] References Cited
UNITED STATES PATENTS
3,503,687  3/1970  Venema ...................... 356/106
FOREIGN PATENTS
1,045,730  10/1966  Great Britain .......

Primary Examiner—Ronald L. Wibert
Assistant Examiner—Orville B. Chew, II
Attorney—Craig, Antonelli and Hill ABSTRACT: An optical device for measuring the diameter of thin fibers using a converging beam of coherent light and including means for supporting the fiber in the convergent light beam, means for rotating the fiber around its longitudinal axis and translating the fiber in orthogonal directions, and recording means for recording the diffraction diagram of the fiber.

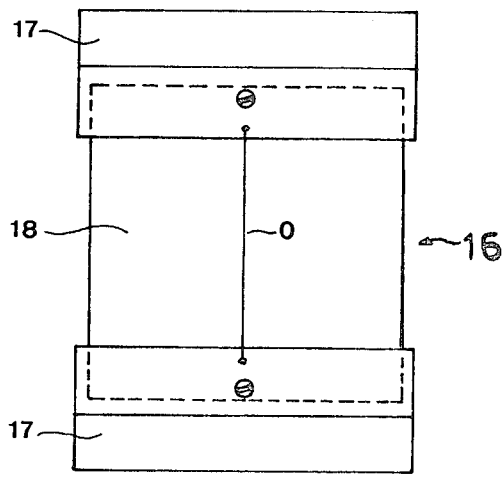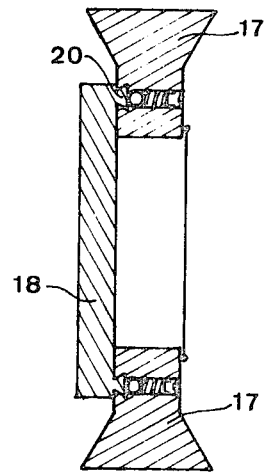
FIG. 5B   FIG. 5C
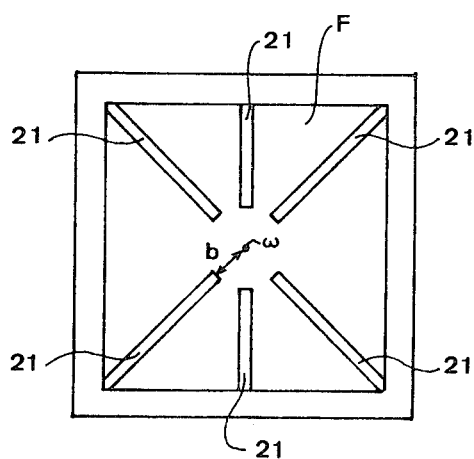
FIG. 8

DEVICE FOR MEASURING THE DIAMETER OF FIBERS AND THREADS OF SMALL THICKNESS USING A CONVERGENT COHERENT LIGHT BEAM

Measuring the diameter of fibers and threads of small thickness with the conventional methods is difficult and very inaccurate.

There exists moreover no device for performing such measurements on an industrial scale.

According to a usual method, the fiber or thread to be measured is embedded in a block, for example in a resin block.

This block is subsequently cut into pieces so as to make it possible to achieve measuring of the fiber diameter through observation with a microscope.

But the fibers whose diameter is smaller than 2 or 3 microns are invisible to the naked eye and consequently are difficult to handle and to embed in resin.

A measurement carried out with such a method is then very difficult to carry out and cannot be effected automatically.

Moreover this method is destructive.

The fiber embedded in resin which has been used for one measurement can no longer be used in particular for further measurements.

Preferably another method will be used, based on the study of the diffraction diagram at infinity of an object and particularly adapted to the measuring of fibers of very small diameter, since, according to the very basic concept of this method, a very small diameter can by no way constitute an obstacle to the measurement.

According to this method, the fiber whose diameter is to be measured is placed in a beam of monochromatic coherent light.

The diffraction of light produced by the fiber results in an increase in the intensity of light in some directions of the space, located behind this fiber and in a cancelling of the illumination in other directions.

It is known that the different rays of light which are diffracted by an object are recombined at infinity thereby producing an interference image which constitutes the spectrum of this object.

In the case of lighting with parallel light, when a convergent lens is located in the light beam behind the fiber, with respect to the light source and a screen is located in the focal plane of this lens, the diffraction image or spectrum of the fiber can be observed on the screen, in the form of a light straight line including separated dark intervals in a direction at right angles to the fiber axis. A recording device, such as an optical-electronic or photographic recorder may be used instead of the observation screen.

The distance separating the dark intervals is inversely proportional to the diameter of the fiber.

This diameter can thus be measured since the proportionality factor only depends on the apparatus which is used.

If the fiber is placed in a beam of parallel light and if the lens which is used is convergent the magnitude of the diffraction diagram only depends on the fiber diameter and on the focal distance of the lens.

The distance $d'$ between the center of the diffraction diagram and the first dark interval is given by the well-known formula $f\lambda/d$, where $f$ is the focal distance of the utilized lens, $\lambda$ is the wavelength of the light and $d$ is the fiber diameter.

Now in the case where the measurements are performed on fibers of various diameters the same lens is not suitable for all these measurements.

As a matter of fact, if the same lens were used it might happen that the useful part of the diffraction diagram would fall outside the boundaries of the recording device in the case of fibers of very small diameter, which make any measurement impossible, or on the contrary that the size of this useful part of the diagram would be too small in the case of fibers of greater diameter, which would then make difficult any reading or recording of this diagram.

It is necessary in such a case either to change the lens, each changing operation requiring precise adjustments, or to use a device known under the term "zoom."

These operations are therefore not suitable when many and various measurements must be performed.

An object of the present invention is accordingly to provide a device for carrying out the above-described method, enabling precise measurements to be effected on fibers or threads of small diameter, on an industrial scale.

This device makes it possible, without lens change to adapt the size of the diffraction diagram to the requirements of the measurement. In this device the fiber is lighted with a beam of convergent light.

When a fiber, whose diameter is to be measured, is placed in a beam of convergent light, the size of the diffraction diagram depends on the position of this fiber in the light beam.

In this case there thus appears a new parameter, in addition to the focal distance of the lens and the wavelength, and it is possible to adjust the value of this parameter in order to adapt the size of the diffraction diagram to that of the recording device. When the fiber is brought nearer to the lens, the size of this diagram is increased, whereas when the fiber is moved away from the lens the size of the diagram is reduced. It should be moreover noticed that, irrespective of the position of the fiber in the convergent light beam, with respect to the lens, the diffraction diagram is formed in the same plane. Any adjustment of the optical system is thus avoided.

This results from the fact that the law of variation of the size of the diffraction diagram during a displacement of the fiber parallelly to itself along the optical axis is linear.

When the fiber is placed in contact with the convergent lens, the distance between the center of the diffraction diagram and the first dark interval is equal to $f\lambda/d$ as indicated hereinabove.

On the contrary when the fiber is placed exactly in the focal plane of the lens, the diffraction diagram vanishes.

Between these two extreme positions the variation in the size of the diffraction diagram is linear.

Moreover the fiber whose diameter is to be measured often presents variations in its section.

In this case if the light beam, illuminates a certain length of the fiber presenting different diameters the recording shows different superimposed diffraction diagrams partly or wholly overlapping one another.

It is then necessary to light the fiber only over a part of its length where the diameter is substantially constant, which can be obtained by moving the fiber far enough from the convergent lens with respect to the light source.

Another means to select a given fiber length consists in using a diaphragm which is placed in the light beam between the lens and the fiber. Generally the different fiber portions along the direction of elongation of the fiber must be studied successively, so as to determine the variations of the diameter along this direction.

The variations of this diameter in one and the same section of the fiber and in particular the elliptical character of this section will also be determined.

If this section has an irregular shape its apparent diameter will be measured, corresponding substantially to the distance between the two points most remote from each other in the portion of the fiber intersected by the light beam, this distance being measuring in a direction transverse to the light beam.

According to a preferred embodiment of the invention, there is provided a device enabling at least half a section of a fiber or thread to be represented, with a size depending of a proportionality factor, in the image of total diffraction obtained by pivoting this fiber or thread around its axis while simultaneously rotating the recording means over the same angle.

According to another embodiment of the invention particularly adapted to the control of the invariability of the diameter of a thread or fiber, there is provided a device making it possible to represent with a proportionality factor a longitudinal section of the thread or fiber by a plane containing the axis thereof, in the form of the image of total diffraction obtained by subjecting the thread or wire to a translation while simultaneously controlling an identical translation of the recording means.

All the measurements can be effected in a precise, fast and continuous way by means of the device according to the invention.

This optical measuring device essentially includes a source S of coherent light, an optical system providing a convergent light beam, an apparatus for supporting and maintaining in the light beam the fiber to be surveyed, with means for rotating the fiber and displacing it by translation along two directions at right angles to each other, an apparatus for recording or viewing the resulting diffraction diagram of the fiber and an optical bench K along which all the above-mentioned elements are slidably mounted.

This measuring device may further include a device for enlarging the light beam emanating from source S, one or more diaphragms, one or more filtering screens, a feedback device for automatically controlling the rotation and the translation of the fiber-carrying apparatus as a function of a corresponding rotation and translation of the recording apparatus, a device for measuring the elliptical character of the fiber, reference scales, a support member for adjusting the inclination of the fiber, relative to the optical axis, and different support elements for maintaining or displacing the fiber, the reference scales and a cylindrical lens.

The invention will be described more in detail hereinafter, with reference to the accompanying drawings wherein like reference numerals designate identical elements.

FIG. 5B illustrates a front view of the fiber-carrying frame.

FIG. 5C shows a longitudinal sectional view of the same fiber-carrying frame.

FIG. 8 shows a filtering screen.

Figure 9:
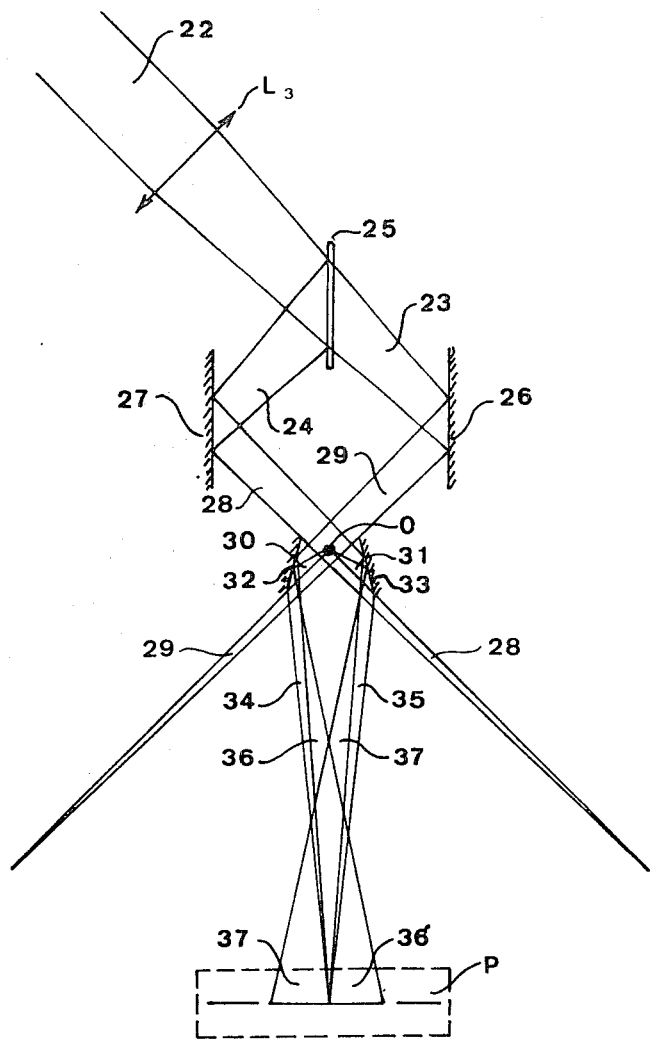
FIG. 9 shows a particular device for determining the elliptical character of the fiber.
Figure 9A:
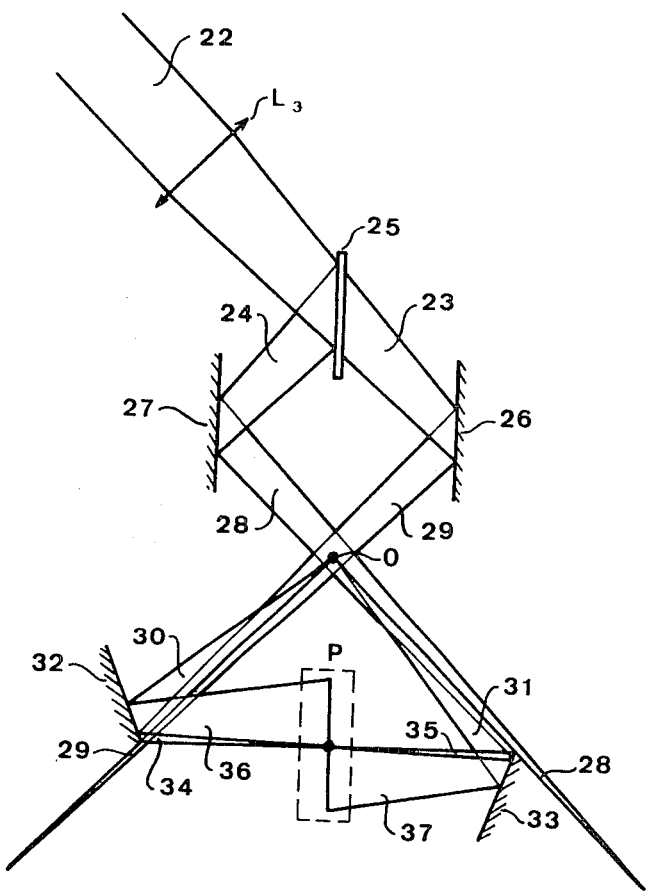
FIG. 9A shows another embodiment of the device of FIG. 9.
Figure 9B:
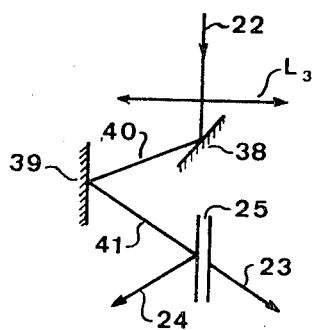

FIG. 9B diagrammatically illustrates a further embodiment of the devices of FIGS. 9 and 9A.

Figure 10:
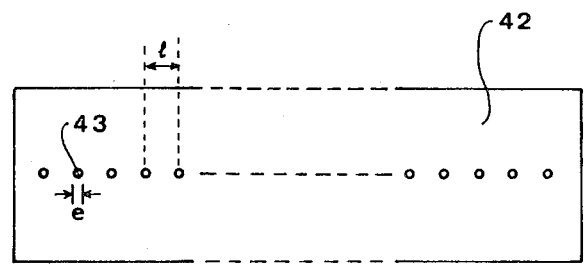

FIG. 10 illustrates a screen used for calibrating the diffraction diagrams.

Figure 11:
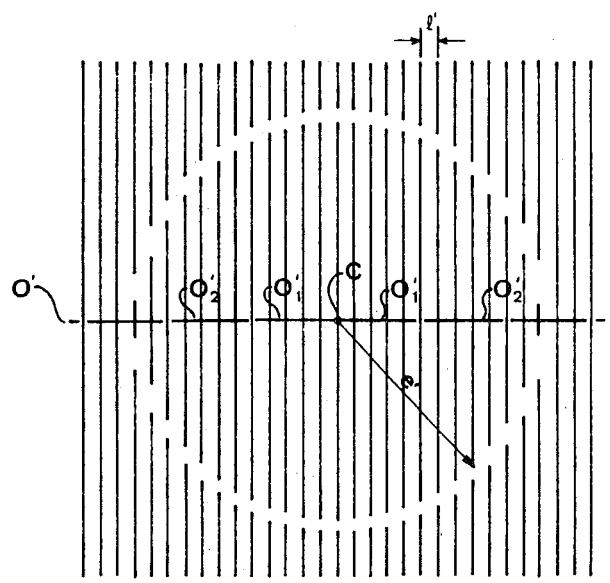

FIG. 11 shows the diffraction diagram of the screen illustrated in FIG. 10.

Figure 2:
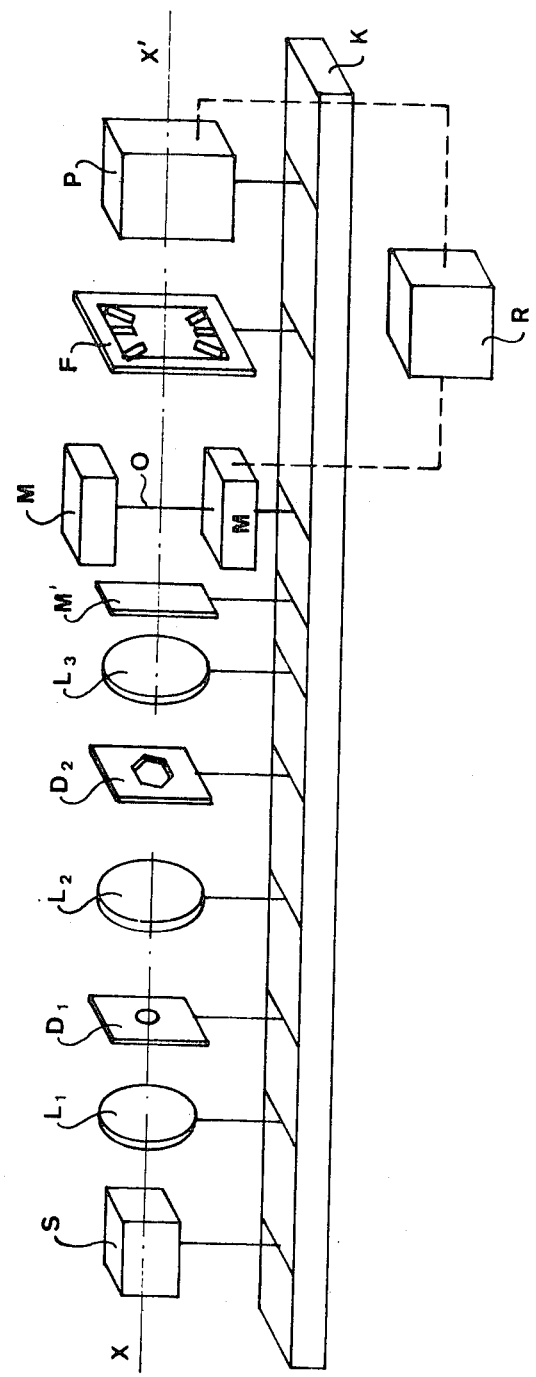
FIG. 2 represents the overall diagram of the measuring device according to the invention.
Figure 12:
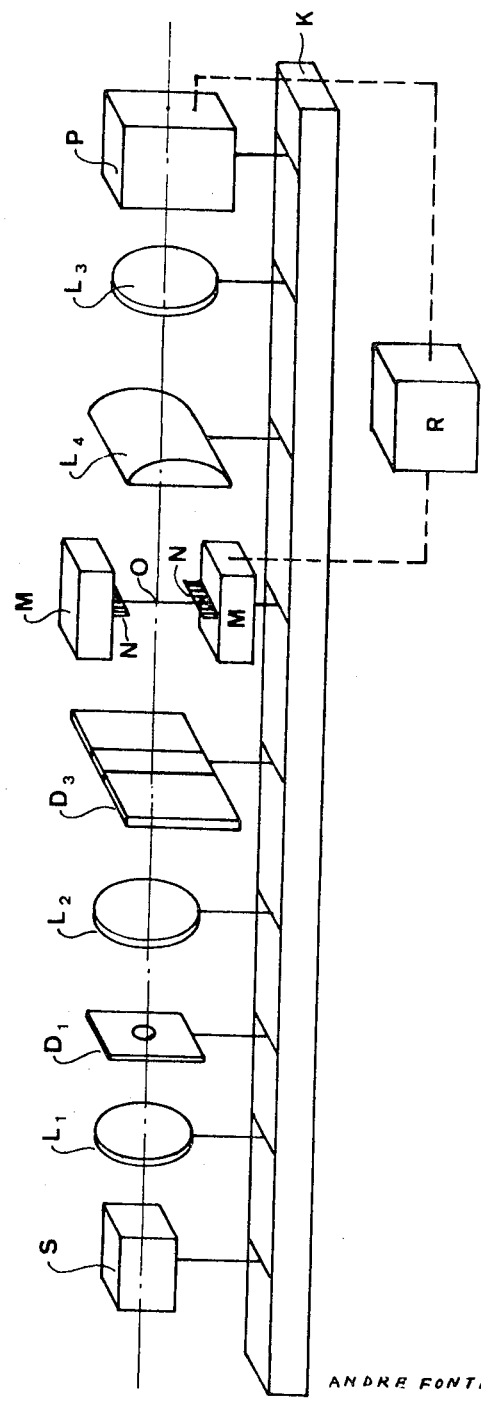

FIG. 12 illustrates another embodiment of the measuring device illustrated in FIG. 2.

Figure 13:
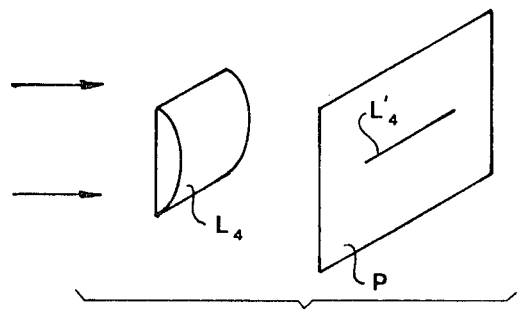
Figure 13:
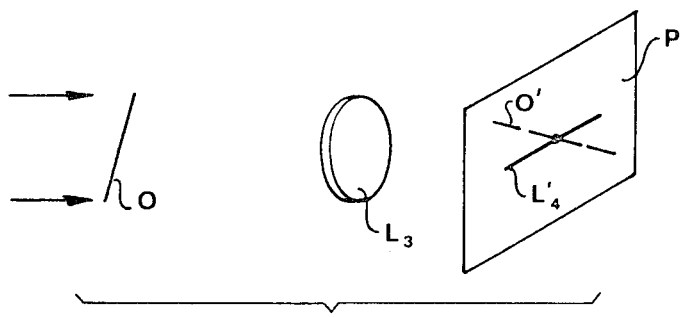
Figure 13:
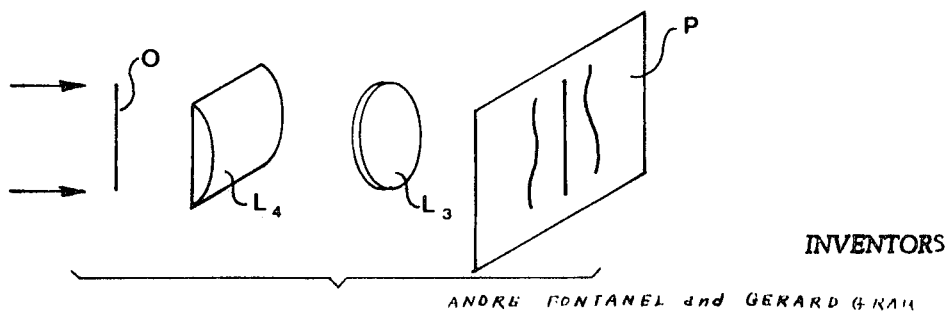

FIG. 13 diagrammatically illustrates the lighting of cylindrical lens with parallel light and the image obtained in the focal plane of this lens.

FIG. 13A diagrammatically illustrates the lighting with parallel light of a fiber associated with a spherical lens and the resulting diffraction diagram.

FIG. 13B diagrammatically illustrates the lighting with parallel light of a fiber associated with a cylindrical lens and with a spherical lens and the resulting diffraction diagram.

Figure 14:
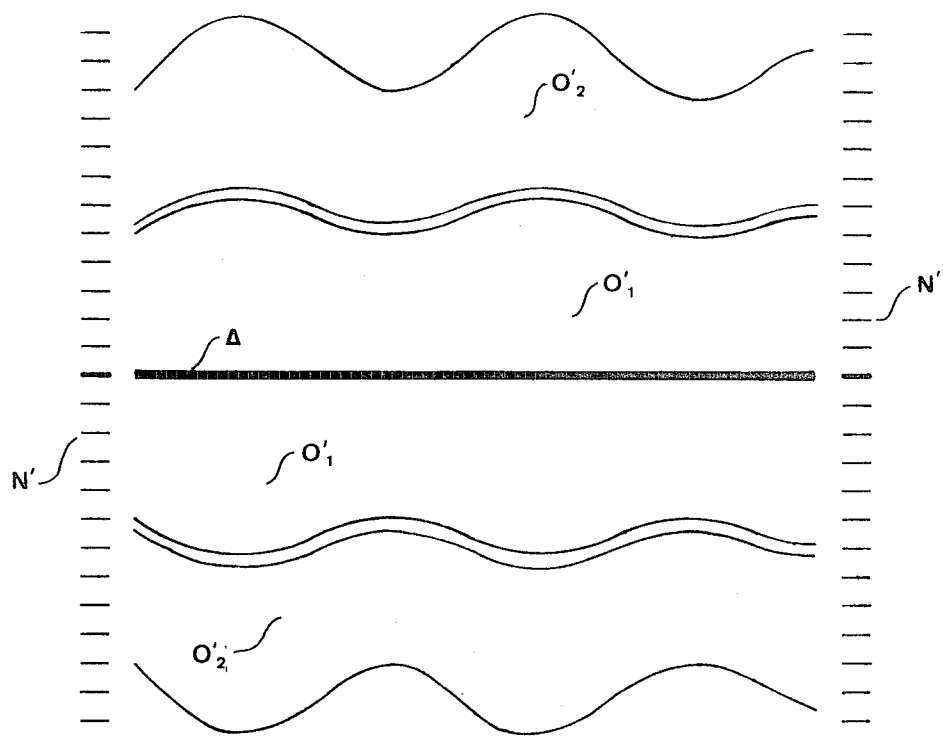

FIG. 14 shows more in detail the diffraction diagram illustrated in FIG. 13B.

Figure 15:
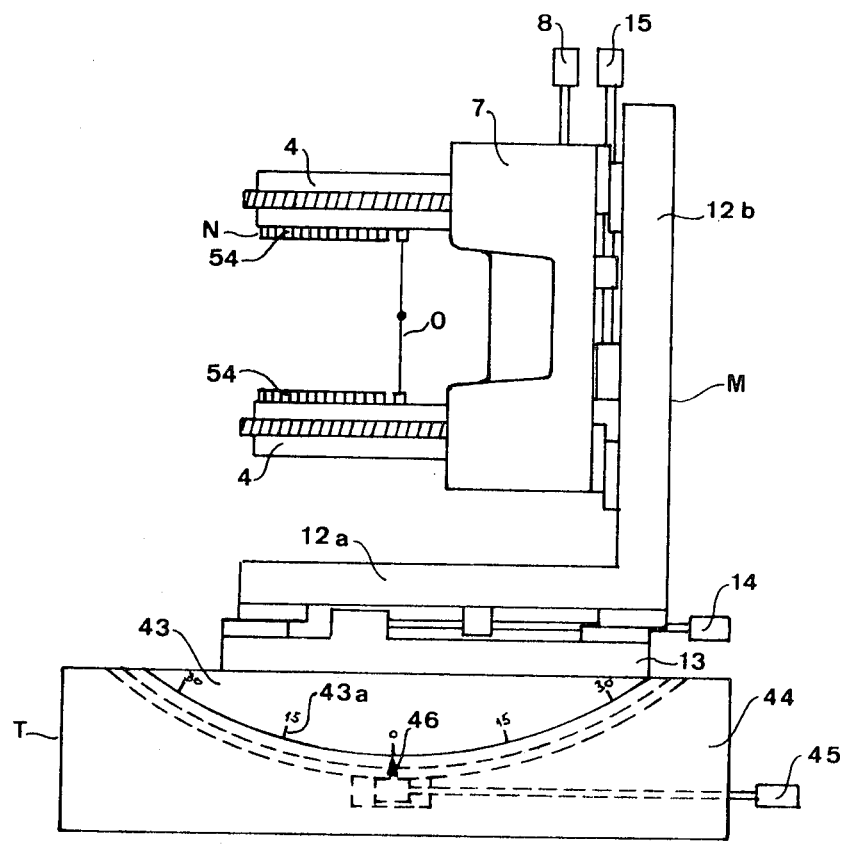
Figure 15:
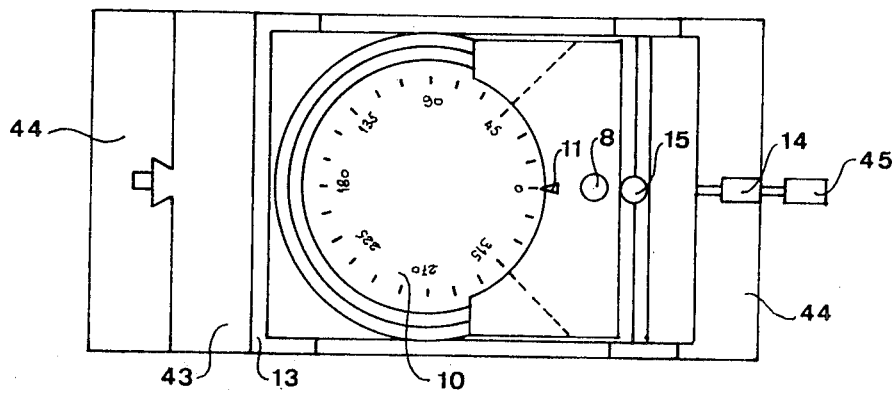

FIG. 15 shows a support member for rotating the apparatus M around the axis of the optical system.

FIG. 15A represents a top view of the apparatus M associated with the support member of FIG. 15.

Figures 16, 16A:
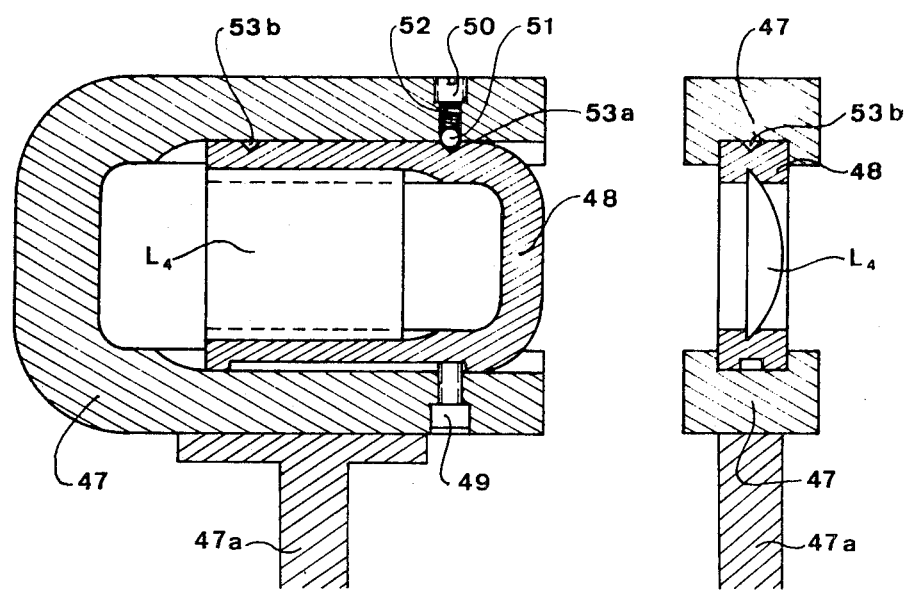

FIG. 16 illustrates a support element for a cylindrical lens.

Referring to FIG. 2, the whole measuring device includes the following elements:

a. a source S of coherent light, preferably consisting of a laser.

b. a device for enlarging and filtering the light beam, including for example a first spherical convergent lens $L_1$ having a short focal distance (not exceeding a few millimeters), a second spherical convergent lens $L_2$ having a focal distance greater than that of the first lens (for example about 10 centimeters) and constituting with $L_1$ a focusless system, and a diaphragm $D_1$ located between the lenses $L_1$ and $L_2$ and only provided with an orifice having a diameter of some microns, located on the optical axis of the device and in the focal plane of the lent $L_1$. This enlarging and filtering device makes it possible to obtain in a well-known manner a parallel light beam whose light intensity is substantially constant.

c. a spherical convergent lens $L_3$ having a focal distance comprised between for example 30 and 100 cm.

d. an adjustable diaphragm $D_2$ preferably located between lenses $L_2$ and $L_3$ or behind lens $L_3$.

e. a device M used as a support for the fiber 0 to be measured and including elements for revolving this fiber, for its translation in a direction parallel to the axis of the optical system and its translation along two directions at right angles to the axis of the optical system.

This device makes it possible in some cases to position a reference object or a reference scale, instead of the fiber and without any change in the adjustment, in order to calibrate the diffraction diagram of the fiber to be measured.

This reference object may also be carried by a supporting element M'.

f. One or more adjustable screens F.

g. An auxiliary device including a sharing blade with several mirrors, in the case where the elliptical character of the fiber has to be surveyed systematically.

h. An apparatus P for viewing or recording the diffraction diagram.

i. A feedback device R for controlling the translations or rotations of the fiber by corresponding translations or rotations of the recording device P.

j. An element K or "optical bench" serving as a support member for the assembly of elements constituting the measuring device, this element K being either rectilinear or bent according to the requirements.

It would be obviously possible, without departing from the spirit and scope of the invention to omit one or more elements of the device, for example the element for enlarging the light beam, or the diaphragm $D_2$.

The diaphragm $D_2$ is placed between the lens $L_3$ and the fiber 0 (or also between the lenses $L_2$ and $L_3$) so as to select, on the one hand the fiber length to which the measurements are to be applied and to determine, on the other hand, the center of the diffraction diagram, as will be explained hereinunder.

This diaphragm $D_2$ (FIG. 3) consists of two rectilinear, parallel, adjustable blades 1 and of two other pairs of blades 2 and 3 positioned at right angles to each other and which may be stationary the blades of each pair being rectilinear and parallel to each other. Blades 2 and 3 will build a square or rectangle whose sides will preferably make an angle of 45° with blades 1.

Blades 1 are preferably placed in a direction at right angle to that of the fiber. There are thus no parallel sides in the diaphragm. The blades 1 may be moved away from each other and will be moved farther apart when the fiber portion to be measured is longer.

The diffraction diagram of the diaphragm opening is superimposed in the plane of observation on the diffraction diagram of fiber 0. This opening must consequently be so positioned as not to interfere with the diffraction diagram of the fiber, but on the contrary be useful for determining the center of this diagram. However a circular diaphragm gives a diffraction diagram consisting of concentric circles which, by intersecting the diffraction diagram of the fiber, might alter the measurement, particularly if these circles intersect the dark intervals whose locations must be determined in the diffraction diagram.

Figure 3:
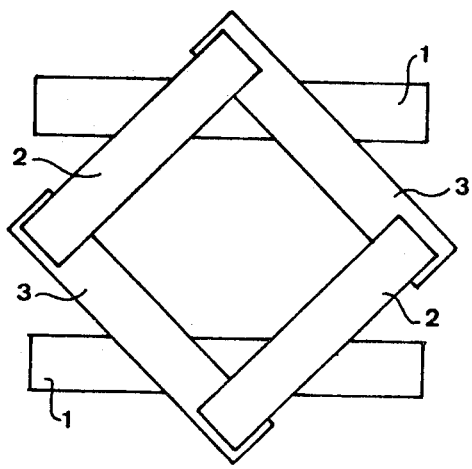
FIG. 3 illustrates the diagram of a diaphragm having a square or polygonal opening.

On the contrary the square or rectangular opening of a diaphragm like the one illustrated in FIG. 3 gives a cross-shaped diffraction diagram $D'_2$ (FIG. 4) whose center C is easy to determine and coincides with the center of the diffraction diagram $0'$ of the fiber. The latter is thus determined and may be used as the origin for the measurement of the distances $d'$ of the light segments.

The substantial quantity of light which is not diffracted by the fiber converges to the center C around which, particularly on a photograph, it appears as a diffusion zone which is referred to as $C_1$.

Moreover the opening provided by spacing blades 1 apart from each other produces a diffraction diagram $D''_2$ which is linear and perpendicular to the diffraction diagram of the fiber, and which may thus also be used in the determination of the center C.

As appears in FIG. 4, diagrams $D'_2$ and $D''_2$ are limited in their size, in a manner to be explained hereinafter.

Any number of rectilinear blades forming between each other any angles may be substituted for the blades 2 and 3, provided however that no blade be parallel to the fiber to be measured.

The fiber-carrying apparatus M includes elements for displacing the fiber by translation along a direction parallel to the axis of the optical system, this translation being for example simply effected by a sliding motion of the whole apparatus M on the support member K. This translation makes it possible, as already explained, to adapt the size of the diffraction diagram of the fiber to that of the observation screen or of the recording apparatus, and also to select a small length of the fiber along which the measurements are to be carried out, which is necessary if the fiber presents variations in its diameter.

As a result of this translation, the measurement of the fiber diameter can be directly effected on the observation screen. One might for example, place on this screen a calibrated reference diagram and effect the necessary translation of the fiber along K so as to make the diffraction diagram of this fiber register with the previously determined reference diagrams. The measurement may then be effected by direct reading on the scale carried by the element K in a direction parallel to the axis of the optical system, using for example the position of lens $L_3$ as an origin.

The apparatus M is also provided with means for rotating the fiber O. This rotation is used for surveying the variations in the fiber diameter in one and the same section of this fiber, particularly for surveying the elliptical character of this fiber, the longitudinal axis of the fiber, perpendicular to the optical axis being brought substantially in line with the rotation axis of the apparatus, so that during its rotation the fiber remains in the light beam.

In the apparatus M, the means for rotating the fiber 0 include two discs 4 (FIG. 5) substantially parallel to each other and between which the fiber is secured.

Each is associated with a toothed ring 5. The discs 4 with their associated toothed rings 5 are housed in dovetailed recesses 6 provided in a support member 7.

The rotation of the discs 4 in the recesses 6 is effected by means of a shaft 8 which drives the toothed rings 5 through two pinions 9 secured to the rod.

The upper part of the disc 4 carries a circular graduated dial 10 (FIG. 5) enabling the rotation of the discs 4 and consequently that of the fiber to be located with respect to an index 11.

The support member 7 of the elements for rotating the fiber is made integral with a frame 12 provided with an arm 12b extending in a direction substantially parallel to the fiber and an arm 12a extending in a direction substantially at right angles to the fiber.

The discs 4 each include a rectilinear dovetailed slot 4a enabling to insert thereinto a fiber-carrying frame which will be described hereinunder.

Figure 5:
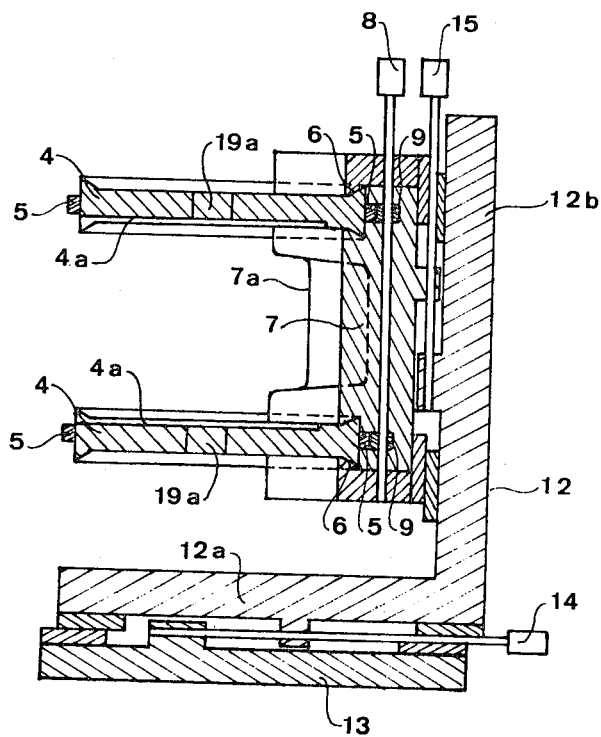
FIG. 5 is a sectional view of the device for rotating and displacing by translation the fiber, in a plane containing the measured fiber and the axis of the optical system.
Figure 5A:
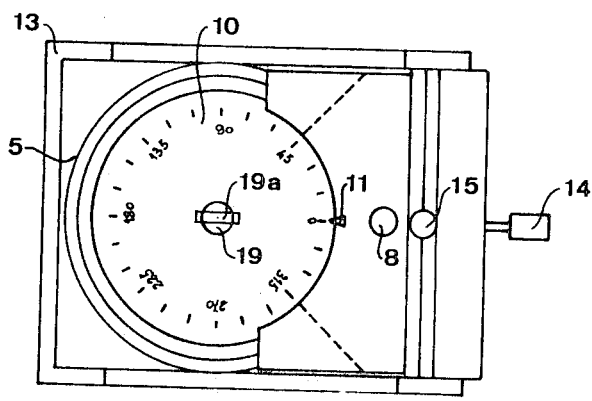
FIG. 5A represents a top view of the device of FIG. 5.

The shape of the support member provided with a recess 7a, as shown in FIG. 5, is spacially so designed as to optionally illuminate the fiber simultaneously with two perpendicular light beams, in a plane at right angles to the fiber.

The structure of this device makes it possible to impart to the fiber a complete revolution, without any element of the assembly of apparatus M coming through the path of the light beam.

The apparatus M also includes means for displacing the fiber by translation in a direction at right angles both to the axis of the optical system and to the direction of elongation of the fiber, for example a base support 13 on which is slidably mounted, by means of a screw 14, the arm 12a of frame 12. This provides a translation of the whole system for rotating the fiber and enables in particular to make the fiber axis pass through the axis of the optical system.

The apparatus M is provided with means for displacing the fiber in a direction parallel to its own direction of elongation, for example a screw 15, in association with the arm 12b of the frame 12, permitting displacement of support member 7 with respect to this arm 12b.

As hereinabove indicated the discs 4 of the rotation means are provided with slots 4a for receiving a fiber-carrying frame. This frame 16 is provided with two elements 17 to which are respectively secured the two ends of fiber 0, for example by sticking with wax. The frame 16 (FIG. 5B) includes moreover a rigid element 18 providing for connection between the elements 17. The so constituted assembly is rigid.

The frame 16 is inserted into the diametral slots 4a of the discs 4 so that the direction of elongation of the fiber is substantially aligned with the rotation axis of the system. This frame may be secured to these discs for example by means of screws 19 penetrating into orifices 19a of the two discs 4, or by any other securing means.

The rigid element 18 may then be removed, the apparatus being then in its operating position.

The rigid element 18 may be secured to the elements 17 by different means: dovetails 20 (FIG. 5C) inserted into suitable recesses, or articulation permitting a rocking motion or also through magnetizing.

The holes 19a will preferably have an elongated shape so as to make possible a displacement of the elements 17 with respect to the discs 4 along a direction perpendicular to the axis of the optical system, whereby an accurate adjustment in position of the fiber can be achieved by bringing the same in coincidence, in the light beam, with the revolving axis of the system.

The apparatus M as a whole, which may slide along the optical bench K in a direction parallel with the optical axis, thus provides for a possible rotation of the fiber, a translation of said fiber along any of two directions perpendicular to each other, or even, in view of a thorough survey of the fiber shape a combination of a rotation with a translation along a direction parallel to the direction of elongation of the fiber.

This translation of the fiber support will necessarily be accompanied with a translation of the recording apparatus P along the same direction, the coordination of these translations being achieved by means of a controlling device R of a known type (see for instance Ahrendt and Savant, Servomechanisms Practice, McGraw-Hill Book Company).

Figure 1:
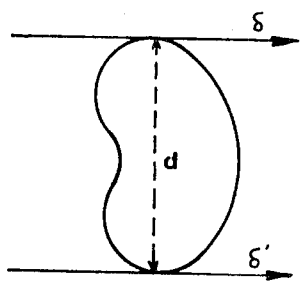
FIG. 1 shows diagrammatically the irregular-shaped section of a fiber and its apparent diameter $d$.
Figure 4:
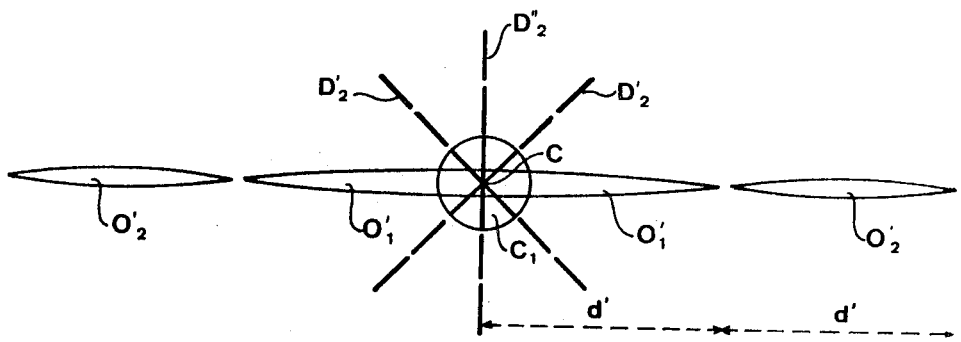
FIG. 4 represents the diffraction diagram of the diaphragm of FIG. 3, superimposed on the diffraction diagram of a fiber.
Figure 6:
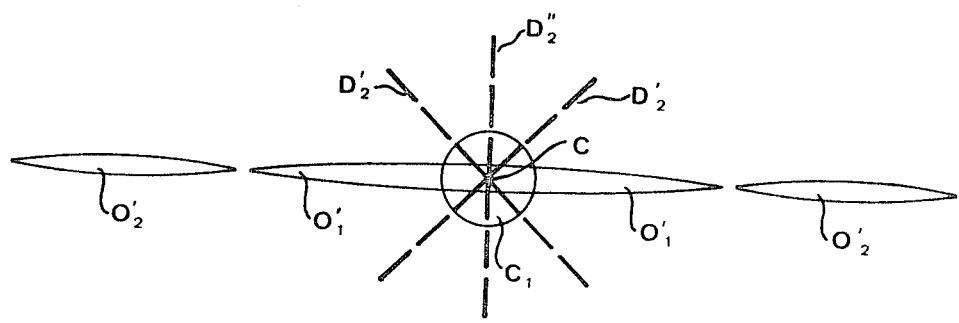
FIG. 6 is a reproduction of FIG. 4.
Figure 6A:
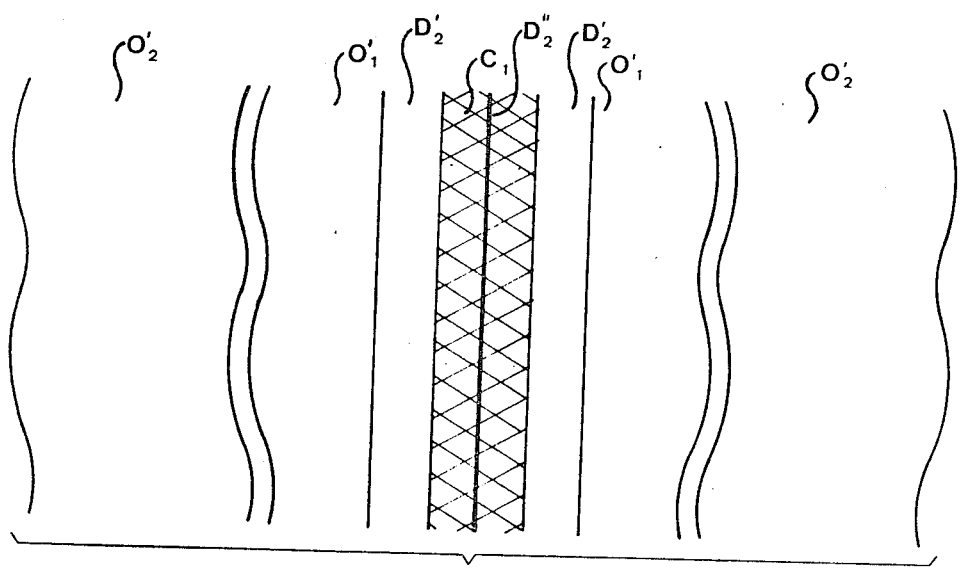
FIG. 6A represents a diffraction diagram obtained by effecting a rotation of the fiber about its longitudinal axis, combined with a translation of the recording device P along a direction parallel to the longitudinal axis of the fiber.

An example of a diffraction diagram obtained in the course of these operations is shown in FIG. 6A where the different zones $O'_1$, $0'_2$, $D'_2$, (corresponding to the part of the diffraction diagram which is shown in FIG. 4), $C_1$ and the straight line $D''_2$ are generated by a translation of the elements having the same references in FIG. 6 (which is a copy of FIG. 4). In this case there will be measured, for instance, the distance separating one of the limits of zone $0'_1$ from the median axis C of the diagram.

When the apparatus P is formed of an assembly of photoelectric cells, the variations in the apparent diameter of the fiber, i.e. the width variations of zones $O'_1$ and $O'_2$, are recorded in the form of an electrical signal which varies as a function of time.

Figure 7:
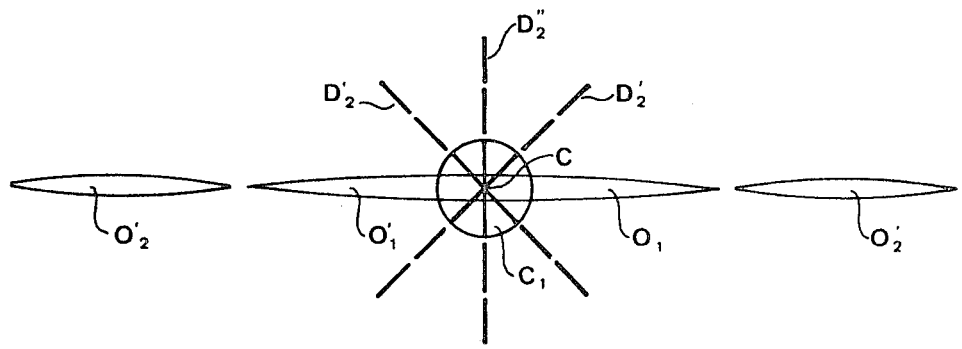
FIG. 7 is a reproduction of FIG. 4.

It is also possible to provide for a rotation of the recording apparatus about the axis XX' of the optical system, which rotation is controlled through the device R by the rotation of the fiber O around its own longitudinal axis. The so obtained recorded diagram is that of FIG. 7A wherein zones $O'_2$, $O''_2$, $D'_2$, $D''_2$ (for instance registering with $D'_2$) and $C_1$ are generated by the rotation, about the optical system axis XX', of the zones of same reference of FIG. 7 which is a copy of FIG. 4.

The diffraction diagrams being always symmetrical with respect to their center, a revolution of the fiber over 180° would theoretically be sufficient. However, in this case, the center of the diagram could not be determined, due to the presence of a central diffusion zone $C_1$. However when a complete revolution over 360° of the fiber is carried out, it becomes possible by making use of symmetry characteristics, to accurately determine the width of each light zone diametrally and symmetrically with respect to the center.

Figure 7A:
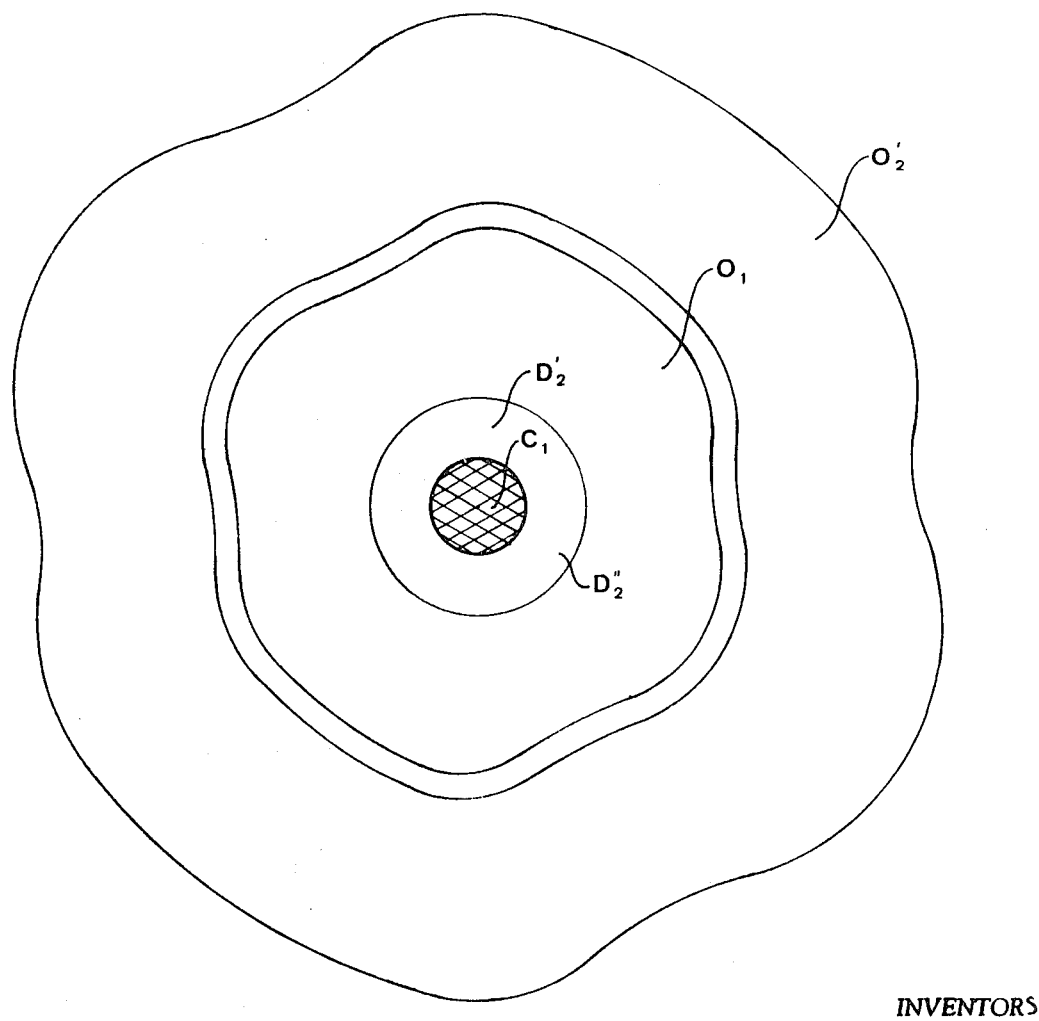
FIG. 7A illustrates a diffraction diagram obtained by effecting a rotation of the fiber around its longitudinal axis, together with a rotation of the apparatus P about the axis of the optical

The diameter shown in FIG. 7A (the term diameter being used to designate a straight line portion passing through the center and joining to symmetrical points of the first dark zone) is thus inversely proportional to the apparent diameter of the fiber as heretofore defined.

But it is necessary in the case of a rotation or a translation of the fiber, to limit by means of convenient screens, the diffraction diagram of diaphragm $D_2$ exclusively to the central part thereof which is necessary only for locating the center of the diffraction diagram.

The part of the diffraction diagram which has to be eliminated (the most remote part with respect to the center) is suppressed in the record by means of screens F (FIG. 8).

These screens may consist of opaque rods 21, in metal for instance, directed perpendicularly to the edges of the diaphragm $D_2$ and whose axis intersects the optical system axis at a common point $w$. These rods are moreover symmetrically disposed with respect to this axis. These screens may also simply consist of two opaque sectors hiding the whole space involved between the rods 21, in the portion of the plane where no projection of the diffraction diagram of the fiber occurs.

The distance $b$ separating the point $w$ from the end of each rod must be such that, in the plane of recording P, the diffraction diagram $D'_2$ and $D''_2$ of the diaphragm $D_2$ be limited to the interior of a circle whose center is on the axis of the optical system and whose radius is lower than the distance between the center C and the end edge of the first light zone $O'_1$ of the diffraction diagram of the fiber.

The elliptical character of the thread may also be measured by use of another device (FIG. 9 and 9A), which is a further variant of the arrangement of the basic device.

IN This case, the light beam 22, on the side of the lens 3 opposite to the light source, is shared into two portions 23 and 23 by means of a sharing blade 25 consisting of a semitransparent mirror, inclined at 45° with respect to the beam axis.

One of the portions 23 of the light beams keeps the same direction whereas the other portion 24 is reflected at an angle of 90° with respect to the beam 22. Two mirrors 26 and 27 are placed respectively on the travel of the beams 23 and 24 so as to reflect them in the form of the beams 28 and 29 which intercross each other at right angle at the lesel of fiber 0 and light the same. One part of each beam 30, 31 is thus diffracted by the fiber whereas the other is not.

A portion of the nondiffracted part 28, 29 and a portion of the diffracted beam 30, 31 are received on the mirrors 32, 33 located in the vicinity of 0, and reflected, thereby forming beams 34, 35 and 36, 37 directed towards the recording apparatus P.

The mirrors 32 and 33 are so placed that only one-half of the diffraction diagram, starting from the center, is reflected towards P.

The second half is not reflected and consequently not recorded. In addition each of these mirrors is so oriented that the portion of the diffraction diagram which it reflects, is coming in line, in the recording plane P, with the portion reflected by the other mirror, in such a manner that the respective centers of the two diffraction diagrams be in exact coincidence.

There is thus recorded in P a diffraction diagram wherein the measurement effected in the portion generated by the beam 36 corresponds to the apparent diameter of the fiber at the place where the beam 29 is cut off by the fiber and the measurement effected in the portion generated by the beam 37 corresponds to the apparent diameter of the fiber at the place where the beam 28, perpendicular to the beam 29 is cut off by the fiber.

It is also possible to receive on each of mirrors 32, 33 the entire diffraction diagram and to stop one half thereof by means of a small opaque screen (not shown) located for instance between the mirrors and the apparatus P.

The device for measuring the elliptical character of the fiber as illustrated in FIG. 9A is a variant of the device shown in FIG. 9, although based on the same principle.

In the case of the device of FIG. 9 the diffraction diagrams are not formed exactly in plane P which is detrimental to their clearness; however this is compensated by the use of a lens $L_3$ of great focal distance and by placing the mirrors 32 and 33 very close to the fiber 0. This requirement does not exist when using the device of FIG. 9A.

The particular device of FIG. 9, or that of FIG. 9A can be associated by bending the support member K after the lens $L_3$, starting from the source (as illustrated in FIG. 9 and 9A) with the main of FIG. 2.

But the assembly formed by the whole device might be kept in line by using additional mirrors 38 and 39 placed between the lens $L_3$ and the sharing blade 25 (FIG. 9B).

Another method though less perfect, for surveying the elliptical character of the fiber, may consist of recording at P, by means of the main device of FIG. 2 and a convenient screen, only one-half of the diffraction diagram of the fiber for a given position thereof. The fiber is then allowed to revolve by 90° about its own longitudinal axis and there is recorded the second half of the new diffraction diagram which is in line with respect to the other.

There can be used a special device for providing a reference scale for the diffraction diagram. This device, illustrated by FIG. 10, consists of an opaque screen 42 provided with a series of identical holes 43, for instance circular, equidistant and in line. This screen is placed in a plane perpendicular to the axis XX' of the optical system, so that the orifices are in line along a direction perpendicular to that of the fiber.

The distance between the holes may be chosen for instance equal to 5 to 10 times the mean diameter of the fibers to be measured. The diffraction diagram of the holes together (FIG. 11) consists of two equidistant straight lines, perpendicular to the diffraction diagram $0'$ of the fiber, the distance $1'$ between two straight lines being inversely proportional to the distance 1 between two holes.

In the case where the fiber 0 and the screen 42 are located in the same plane, with the assumption that the distance 1 between the adjacent holes is, for example, equal to 5 times the diameter $d$ of the fiber, there is counted an each light zone $O'_1$, $O'_2$ of the diffraction diagram $0'$ of the fiber 0, five spaces $1'$. The spacing between the holes being known, the diameter of the fiber can be deduced from the number of light straight lines present for instance between the center C and the first dark zone.

According to a practical embodiment, a photograph is taken at P of the diffraction diagram of the fiber and then, by translation of the apparatus M the fiber is removed apart from the light beam and replaced with the screen 42 which may or not be carried by the same support member. There is taken a photograph of the diffraction diagram of the screen, for instance on the same sensitive support as for the diffraction diagram of the fiber, and superimposed on the latter.

The light straight lines are the more fine and clear as the screen 42 is provided with a greater number of holes 43. During the standardization operation, it is therefore of interest to give the maximum opening to the diaphragm $D_2$ so as to lighten a high number of holes. For instance satisfactory results have been achieved with from 20 to 30 holes.

Moreover, it is required to keep a certain ratio between the mean diameter $d$ of the fiber subjected to measurement and the diameter $e$ of each hole 43 of the standard screen. When the screen 42 is placed in the same plane as the fiber, at right angles to the axis of the optical system, it is necessary that the diameter $e$ of each hole be lower than the mean diameter $d$ of this fiber.

As a matter of fact the lightness of the whole of the light straight lines generated by the diffraction of the holes, is weighted by a function having its maximum at center C and which becomes zero at a distance $e'$ from the center which is proportional to the inverse of the diameter $e$ of each hole.

When the diameter $d$ of the fiber is for instance twice the diameter $e$ of a hole, this weighing function becomes zero beyond the first dark zone of the diffraction diagram of the fiber.

When, on the contrary, this function becomes zero at the even place of the first dark zone, the standardization is made difficult since it is not possible to determine with accuracy the number of straight lines.

However when the fiber is of a small diameter, for instance a few microns, it may be difficult to realize holes of a still smaller diameter. In such a case it is therefore preferable not to place the fiber and the standard screen in the same plane the screen being thus mounted on another support member M' which can sustain a translating along the bench K.

When the fiber $a$ is, for instance, of a diameter of $2\mu$, it will be placed sufficiently remote from the lens $L_3$ so as to reduce its diffraction diagram, for instance to such a distance that the distance between the fiber 0 and $L_3$ is six times the distance between the fiber and the recorder P.

On the contrary the screen 2 will be placed close by the lens $L_3$. In this case the diameter of the holes may be about three times that of the fiber.

It is obvious that there can be effected to a large extent a combination of the relative positions of the fiber and the screen in order to adapt the standard diagram to the sizes of the diffraction diagram of the fiber. The size variations of a diffraction figure follow the above-mentioned linear law.

There may also be realized an opaque standard screen containing, instead of holes, transparent concentric circles the radii of which are in the ratio 1, 2, 3 etc. The diffraction diagram forming the scale is then constituted of concentric circles whose radii are also in the ratio 1, 2, 3 etc. The principle is the same as when using the screen provided with holes, but to the diameter of the holes correspond now the thickness of the circles and to the spacing of the holes correspond now the spacing of the circles.

FIG. 12 shows a variant where there is used a cylindrical lens so as to obtain, without any motion of the fiber, the different diameter values of this fiber over its whole length, even when significant variations of its diameter are to be observed.

The device illustrated in FIG. 12 comprises:

a. A source S of coherent light.

b. A first lens $L_1$, a diaphragm $D_1$ and a second lens $L_2$, these elements being similar to those of the device illustrated in FIG. 2.

c. A diaphragm $D_3$ having a rectangular opening the width of which is adjustable and greater than the mean diameter of the fiber to be measured. The length, also adjustable, of the diaphragm must be at least equal to that of the fiber. The edges of the opening may be parallel to the fiber.

d. The fiber 0 to be measured, placed on its support member M.

e. A reference scale N placed in the plane of fiber 0 and maintained by discs 4 of the apparatus.

f. A cylindrical lens $L_4$ whose focal distance may be, as that of $L_3$, of about from 30 to 100 cm. and whose generating lines are perpendicular to fiber 0.

g. A spherical lens $L_3$ identical to that of the device shown in FIG. 2.

h. A recording apparatus P placed in the focal plane of the lens $L_3$ when the fiber is lightened with parallel beams.

The fiber 0 may also be lightened with a convergent or divergent beam provided that points $D_1$ and P be conjugated (in the sense of optical geometry) in a direction perpendicular to the fiber 0, on the one hand and o and P be conjugated in a direction parallel to the fiber, on the other hand.

The direction of elongation of the fiber must be perpendicular to the generatrices of the cylindrical lens $L_4$. The measurement is therefore limited in this case to substantially rectilinear fibers.

When using a lighting with parallel beams, the distance between lens $L_4$ and $L_3$ is not critical. In particular these two lens may be juxtaposed or form together a single spherocylindrical lens. In the case of FIG. 12 with a lighting by parallel beams, the fiber O is placed in the plane of the object-focus of lens $L_4$. The recording (or viewing) is then to be effected in the image focus plane of the lens $L_3$.

In order to be sure with accuracy that the lens $L_4$ is exactly perpendicular to the fiber O, there can be located for instance, on the recording support P, the orientation of the generatrices of $L_4$, which location is made only once when starting the operation of the apparatus. This can be achieved by removing the lens $L_3$ and the fiber O and lighting the lens $L_4$ with parallel beams. There is so obtained on the support member P placed in the focal plane of $L_4$, a light straight line $L'_4$ (FIG. 13), which is the image of the source given by $L_4$, this line being parallel to the generatrices of the lens $L_4$. This straight line is then located on the recording support P. This location has to be carried out only once, before the beginning of the measuring operations.

The fiber O has then to be oriented along a direction perpendicular to the generatrices of $L_4$. This can be achieved by removing the lens $L_4$ and placing in the parallel light beams the spherical lens $L_3$ as well as the fiber O. It is then observed, on the support member carrying the mark $L'_4$ and placed in the focal plane of $L_3$ the linear diffraction diagram O' of the fiber (FIG. 13A). Thereafter, if needed, the fiber O can be revolved about the axis of the optical system, by using a special device for this purpose as described hereinafter, until said diffraction diagram registers with the straight line $L'_4$. Such an adjustment is to be made for each new fiber.

The lens $L_4$ is thereafter brought back to its first position which has been located preliminarily. It is necessary, in order to achieve the measurement of the apparent diameters with the use of this device, that the fiber be rectilinear. It is estimated that the angular intervals between the longitudinal axis of the fiber and the generatrices of the cylindrical lens must not exceed a few degrees. This case is illustrated by the diffraction diagram shown in FIGS. 13B and 14.

Such diffraction diagram comprises a central light line $\Delta$, which is the image of the source and is perpendicular to generatrices of $L_4$ and, on both sides of this line, two light zones $O'_1$, $O'_2$ intersected with dark zones symmetrical with respect to $\Delta$, as is the case in FIG. 6A. The spacings between the central line $\Delta$ and the first dark zone are inversely proportional at each point to the apparent diameter of the fiber at the corresponding point.

FIG. 15 shows a device for adjusting the inclination of the fiber O with respect to the axis of the optical system.

This device T comprises a stationary support member 44 including a cup in the form of cylindrical sector and a support member 43, also in the form of a cylindrical sector, rotatable with respect to 44 and whereupon is secured the base 13 of the apparatus.

A screw 45 allows rotation of the support member 43 and consequently of apparatus M, about the axis of the optical system, the rotation axis being said latter axis. The rotation angle is determined by means of graduations 43a carried on a moveable sector 43, and of a reading index 46 carried by the stationary support member 44.

A top view of this device is shown in FIG. 15A.

The support of the cylindrical lens $L_4$ is illustrated in FIG. 16. This support comprises a base element 47 including an element 47a for connection to bench K, a moveable lens-carrying frame 48 slidably mounted in slots provided in the base 47. A stopping screw 49 limits the stroke of the frame 48 in said slots, whereas another screw 50 provided with a ball 51 pushed by a spring 52, provides for the locking of the frame, in cooperation with recesses 53a provided therein, either in working position (illustrated in the figure) or in retracted position 53b in view of effecting an adjustment.

In order to remove the lens $L_4$ from the light beam, there can be also conceived a device providing for its rotation about an axis parallel to the axis of the optical system. There can be observed, on FIG. 15, a reference scale N used in connection with a cylindrical lens. This scale comprises two identical members 54 secured opposite to each other on the discs 4 of the apparatus M, along a direction perpendicular to the thread.

Their spacing along an axis parallel to the elongation direction of the thread is greater than the length of the latter.

Each element 54 consists of an opaque screen carrying transparent equidistant marks. Each element will advantageously comprise about 20 marks of any length. The elements 54 must be in the object focal plane of the cylindrical lens in the embodiment of FIG. 12, and each mark of the scale must be parallel to the direction of elongation of the fiber.

Their thickness and their spacings are subjected to similar limitations as for the holes of the screen 42 of FIG. 10.

The diffraction diagram N' of the scale, due to the selected spacing between its elements, comes in addition to the diffraction diagram of the thread in plane P (FIG. 14) without however being superimposed on the latter.

In the case of use of a cylindrical lens, the operations necessary for the survey on the elliptical character of the fiber, are the same as those described above. In the case where the diffraction diagrams are recorded by half, the junction line of the two halves can be easily determined from the diffraction diagram N' of the scale N. In fact the central mark of diagram N' is part of the light line M, which enhances its brightness and provides for a more accurate adjustment. When the thread is revolved about its axis, the standardization is accurate only when the entire scale is placed in the focal plane of $L_4$.

What we claim is:

1. An optical device for measuring the diameter of thin fibers comprising a light source generating a beam of coherent light, a lens for converging said light beam, means for supporting at least one fiber within said convergent light beam, including first means for rotating the fiber around its longitudinal axis, second means for translating the fiber along a direction perpendicular to a plane containing both the fiber and the beam axis and third means for translating the fiber along a direction perpendicular to the beam axis in a plane parallel to the fiber, recording means for recording the diffraction diagram of the fiber and a support element for supporting all of said means and said lens.

2. Device according to claim 1, wherein said first means for rotating the fiber comprise two substantially parallel discs provided with two parallel slots and toothed wheels for driving said discs.

3. Device according to claim 2, further comprising a support member for adjusting the inclination of the supporting means with respect to the beam axis and in a plane perpendicular thereto, said support member comprising a stationary element provided with a cup in the form of a cylindrical sector, a moveable element in the form of a cylindrical sector, means for securing the supporting means to said moveable element, means for rotating said moveable element with respect to the stationary element and means for indicating the displacement of said two elements with respect to each other.

4. Device according to claim 1, further comprising means for enlarging the light beam including a diaphragm, having a very small hole and being intercalated between two lenses.

5. Device according to claim 1, further comprising a diaphragm whose opening is defined by a plurality of walls, each of which being oriented in a direction different from that of the fiber.

6. Device according to claim 5, further comprising at least one filtering screen consisting of a frame on which are secured symmetrical small opaque rods respectively perpendicular to the corresponding edges of the diaphragm and whose longitudinal axes intersect one another on the light beam axis.

7. Device according to claim 1, further comprising a means for controlling the rotation of the fiber by the corresponding rotation of said recording means.

8. Device according to claim 1, further comprising means for controlling the translation of said recording means.

9. Device according to claim 1, further comprising a fiber-carrying frame including two substantially parallel elements to which are respectively secured the ends of the fiber and at least one rigid removable member for joining said parallel elements.

10. Device according to claim 1, further comprising means for measuring the extent of the elliptical character of a fiber comprising a beam splitter placed at an inclination of 45° in the convergent beam, two mirrors reflecting the beams issued from the beam splitter and forming two reflected beams which intersect each other at a right angle and illuminate the fiber, the other mirrors reflecting a part of the light beams which are not diffracted by the fiber and a part of the light beams diffracted by the fiber, thereby forming new beams, which intersect on the recording means and form a central light spot, and other beams each of which projecting on the recording means the diffraction diagram of one half of the fiber, on both sides of said central spot.

11. Device according to claim 1, further comprising a reference scale including an opaque screen provided with identical transparent holes, equidistant from and in line with one another, said screen being placed in a plane perpendicular to the light beam axis and the line formed by said holes being oriented in a direction perpendicular to that of the fiber.

12. Device according to claim 11, wherein said holes are circular.

13. Device according to claim 11, wherein the opaque screen comprises transparent concentric circles whose radii are in the ratio 1, 2, 3, etc.

14. Device according to claim 13, further comprising a support member for a cylindrical lens including a base element provided with slots, a moveable lens-carrying frame, the external width of which is adapted to the distance between the slots and provided with locking recesses for different locking positions, a stopping screw and a locking screw for the carrying frame, said locking screw cooperating with the locking recesses.

15. Device according to claim 1, further comprising a cylindrical lens whose generatrices are perpendicular to the fiber, associated with a diaphragm comprising a rectangular adjustable opening whose width is greater than the diameter of the fiber and whose length is at least equal to that of said fiber.

16. Device according to claim 1, wherein the members for rotating the fiber comprise two substantially parallel discs provided with two parallel slots and toothed wheels for driving said discs, further comprising a reference scale including two moveable elements secured opposite to each other on the discs of the apparatus, in the plane of the fiber, each moveable element consisting of an opaque screen with equidistant transparent marks, the thickness of which is smaller than the diameter of the fiber.

* * * * *

UNITED STATES PATENT AND TRADEMARK OFFICE
CERTIFICATE OF CORRECTION

PATENT NO. : 3,623,815

DATED : November 30, 1971

INVENTOR(S) : Andre Fontannel and Gerard Grau

It is certified that error appears in the above—identified patent and that said Letters Patent is hereby corrected as shown below:

The title page of the above-identified patent should be deleted to appear as per attached title page.

Signed and Sealed this

Third Day of June 1980

[SEAL]

Attest:

SIDNEY A. DIAMOND

Attesting Officer

Commissioner of Patents and Trademarks